(12) United States Patent
Jang et al.

(10) Patent No.: US 10,000,136 B2
(45) Date of Patent: Jun. 19, 2018

(54) VEHICLE AND CHARGING CONTROL METHOD OF THE VEHICLE

(71) Applicants: HYUNDAI MOTOR COMPANY, Seoul (KR); KIA MOTORS CORPORATION, Seoul (KR)

(72) Inventors: Young Jin Jang, Pohang-si (KR); Soung Han Noh, Suwon-si (KR); Jun Yeon Park, Yongin-si (KR); Hyung Souk Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 59 days.

(21) Appl. No.: 15/244,640

(22) Filed: Aug. 23, 2016

(65) Prior Publication Data
US 2017/0129348 A1 May 11, 2017

(30) Foreign Application Priority Data
Nov. 9, 2015 (KR) .................... 10-2015-0156661

(51) Int. Cl.
*B60L 11/18* (2006.01)
*H02J 7/00* (2006.01)
(Continued)

(52) U.S. Cl.
CPC ......... *B60L 11/184* (2013.01); *B60L 11/1814* (2013.01); *B60L 11/1861* (2013.01); *H02J 3/14* (2013.01); *H02J 7/007* (2013.01); *H02J 7/0021* (2013.01); *H02J 7/041* (2013.01); *H02J 7/042* (2013.01); *H02J 2003/146* (2013.01); *Y02T 10/6269* (2013.01); *Y02T 10/7005* (2013.01); *Y02T 90/14* (2013.01)

(58) Field of Classification Search
CPC ............... B60L 11/184; B60L 11/1861; B60L 11/1814; H02J 7/0021; H02J 7/007
USPC ........................................................ 320/109
See application file for complete search history.

(56) References Cited

U.S. PATENT DOCUMENTS

| 8,401,722 B2 | 3/2013 | Gale et al. |
| 9,093,844 B2 | 7/2015 | Yonezawa et al. |
(Continued)

FOREIGN PATENT DOCUMENTS

| CN | 102164771 A | 8/2011 |
| CN | 103180747 A | 6/2013 |
(Continued)

OTHER PUBLICATIONS

Korean Office Action dated Mar. 2, 2017, issued in Korean Application No. 10-2015-0156661.
(Continued)

*Primary Examiner* — Sun Lin
(74) *Attorney, Agent, or Firm* — McDermott Will & Emery LLP

(57) ABSTRACT

A charging control method of a vehicle includes setting a reserved charging, closing a first switch in an on-board charger (OBC) controller, measuring an input voltage at an input side of the OBC controller when an external charger supplies power when the first switch is closed, setting a charging start time based on the measured input voltage, and starting charging a battery when the charging start time is reached.

21 Claims, 12 Drawing Sheets

(51) Int. Cl.
*H02J 3/14* (2006.01)
*H02J 7/04* (2006.01)

(56) References Cited

U.S. PATENT DOCUMENTS

| | | |
|---|---|---|
| 9,112,382 B2 | 8/2015 | Paul et al. |
| 9,692,259 B2 | 6/2017 | Boss et al. |
| 2011/0320828 A1 | 12/2011 | Boss et al. |
| 2012/0133337 A1 | 5/2012 | Rombouts et al. |
| 2013/0049677 A1* | 2/2013 | Bouman ............. B60L 1/003 320/106 |
| 2015/0054469 A1 | 2/2015 | Jang et al. |
| 2015/0115873 A1* | 4/2015 | Lee et al. ........... B60L 11/1838 320/107 |
| 2015/0239405 A1* | 8/2015 | Kaihara et al. ..... H01M 10/441 219/202 |
| 2015/0291043 A1* | 10/2015 | Nam et al. .......... B60L 11/184 320/137 |
| 2015/0306973 A1* | 10/2015 | Gunnerud et al. .. B60L 11/1861 320/162 |
| 2015/0326050 A1 | 11/2015 | Baek |
| 2016/0167538 A1* | 6/2016 | Kim et al. ......... B60L 11/1848 320/109 |

FOREIGN PATENT DOCUMENTS

| | | |
|---|---|---|
| JP | 11-275775 | 10/1999 |
| JP | 2011-259652 A | 12/2011 |
| KR | 20120072192 A | 7/2012 |
| KR | 10-2013-0055179 A | 5/2013 |
| KR | 10-2013-0081973 A | 7/2013 |
| KR | 10-2013-0102404 | 9/2013 |
| KR | 101307480 B1 | 9/2013 |
| KR | 10-2014-0031500 | 3/2014 |
| KR | 10-1390911 B1 | 5/2014 |
| KR | 10-2014-0099031 A | 8/2014 |
| KR | 10-1519780 B1 | 5/2015 |
| KR | 10-2015-0071121 A | 6/2015 |
| KR | 10-2015-0075630 A | 7/2015 |

OTHER PUBLICATIONS

Notice of Allowance issued in corresponding Korean Patent Application No. 10-2015-0156661 dated Sep. 12, 2017.

* cited by examiner

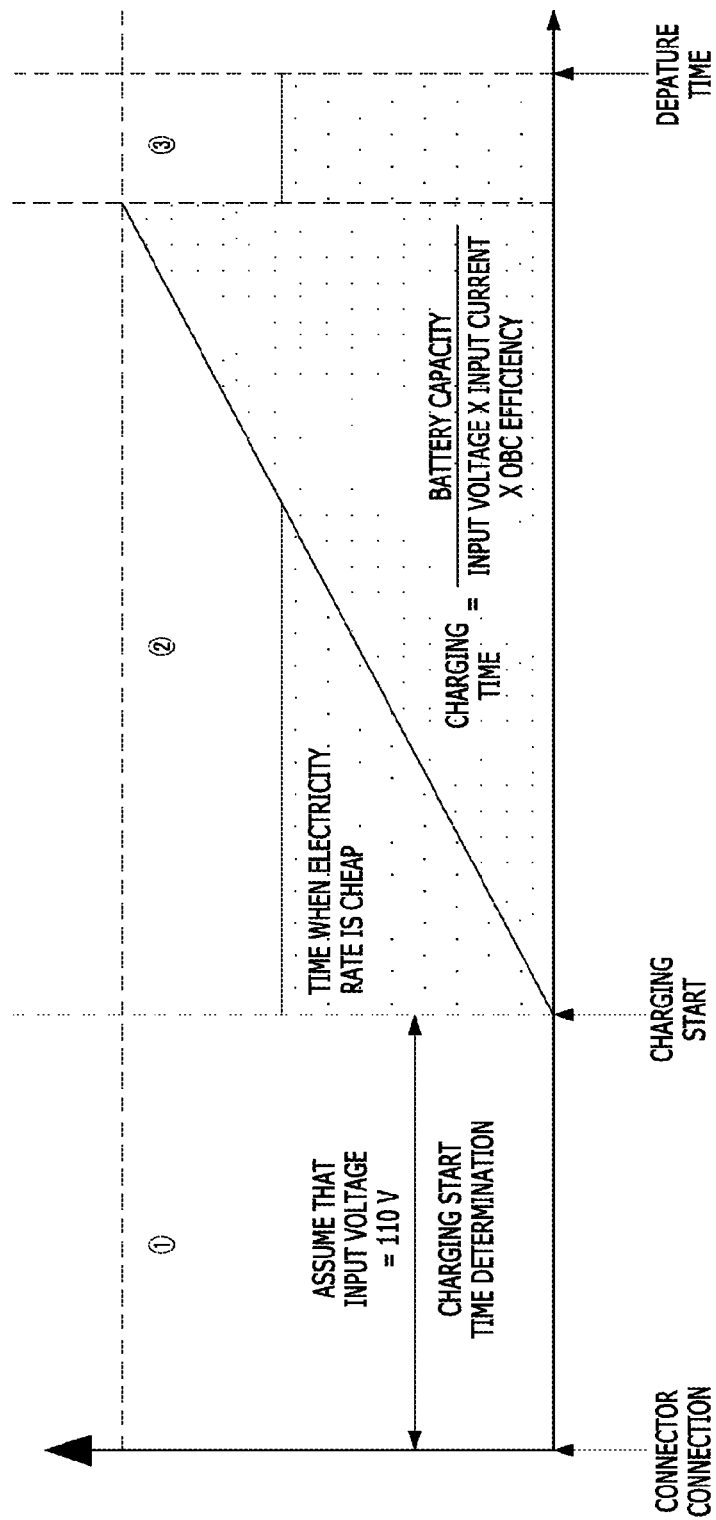

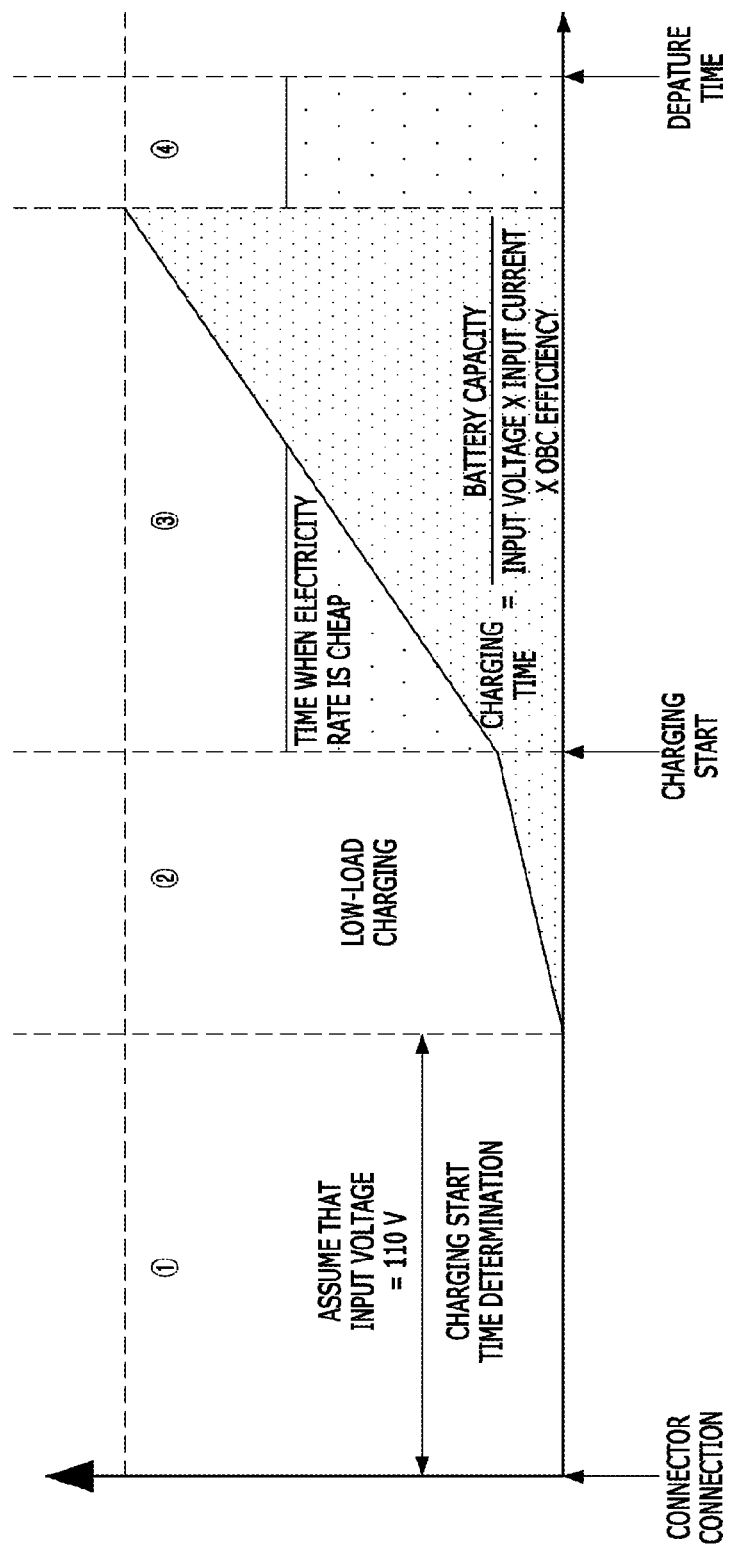

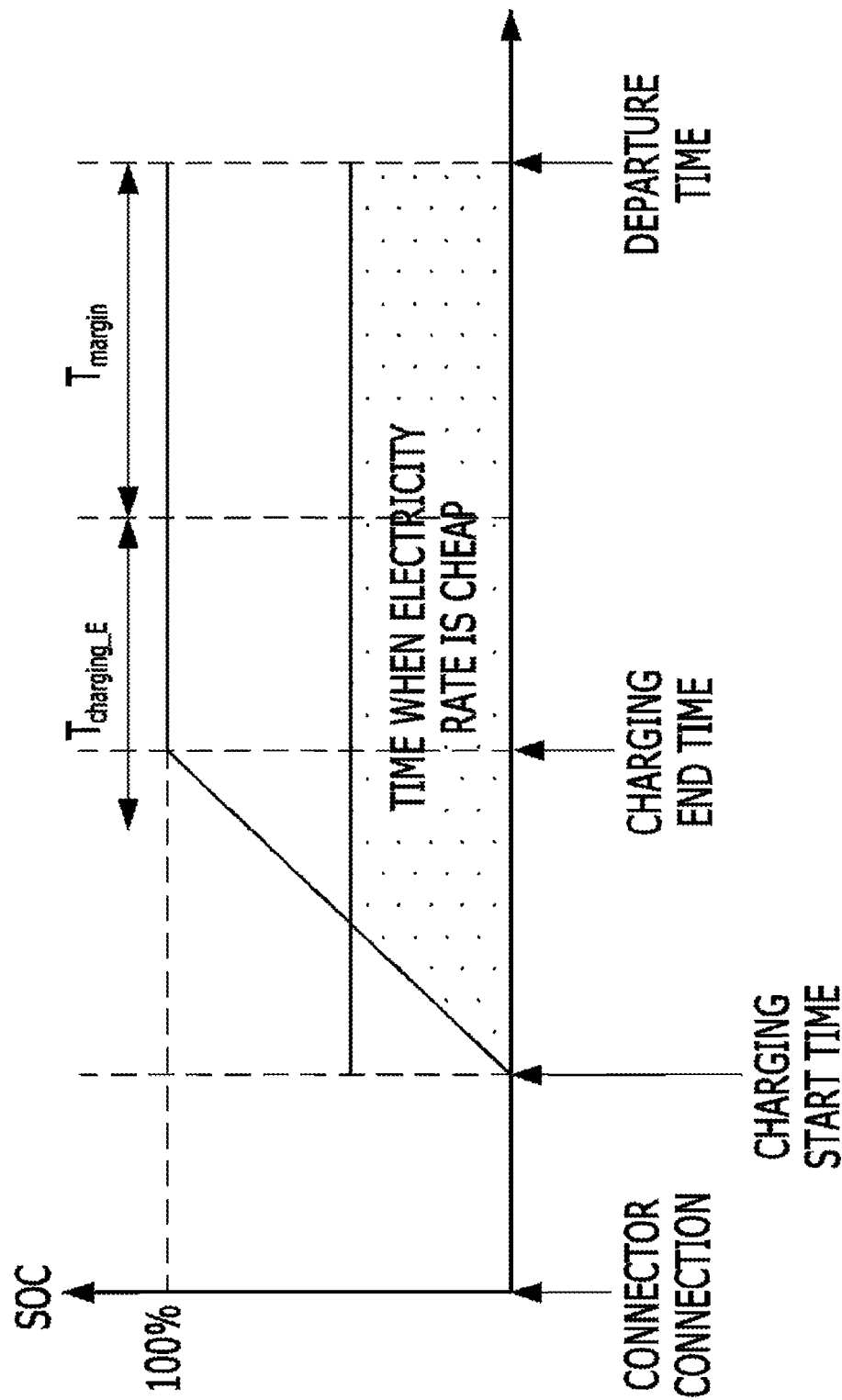

VEHICLE AND CHARGING CONTROL METHOD OF THE VEHICLE

This application claims the benefit of Korean Patent Application No. 10-2015-0156661, filed on Nov. 9, 2015 with the Korean Intellectual Property Office, which is hereby incorporated by reference as if fully set forth herein.

TECHNICAL FIELD

The present disclosure relates to a vehicle capable of efficiently performing reserved charging and a charging control method of the vehicle.

BACKGROUND

Hybrid electric vehicles (HEV) attract considerable attention as eco-friendly vehicles. A hybrid vehicle generally refers to a vehicle using two power sources. The two power sources may include an engine and an electric motor. Such a hybrid vehicle has excellent mileage and power performance as compared to a vehicle having only an internal combustion engine, and further produces decreases emissions. Therefore, many hybrid vehicles have been developed.

Among hybrid vehicles, a plug-in hybrid electric vehicle (PHEV) may be plugged in to charge a battery for driving an electric motor with external, or electrical, power.

In addition, an electric vehicle (EV) is also attracting considerable attention as another eco-friendly vehicle. Since the electric vehicle is generally driven using only an electric motor, a battery for driving the electric motor needs to be charged.

Such an EV or PHEV has a reserved charging function for automatically charging a battery when the vehicle is not used and when late night electricity is available and/or lower in cost, in consideration of departure times for user convenience.

However, even if the reserved charging function is used when a late night electricity rate is applicable in consideration of departure time, the battery may not be sufficiently charged by the departure time according to an external conditions or equipment (e.g., when input voltages of 110 V and 220 V are mixed). Charging logic may be changed according to charger type (e.g., in-cable control box (ICCB) and EV supply equipment (EVSE)), which may be confusing to a driver.

SUMMARY

Accordingly, the present disclosure is directed to a vehicle and a charging control method thereof that substantially obviate one or more problems due to limitations and disadvantages of the related art.

An object of the present disclosure is to provide a vehicle for more efficiently providing a reserved charging function, and a control method thereof.

Another object of the present disclosure is to provide a vehicle capable of providing an optimal reserved charging function in consideration of an actual charging environment, and a control method thereof.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a charging control method of a vehicle including an electric motor and a battery for driving the electric motor may include setting reserved charging, closing a first switch in an on-board charger (OBC) controller, measuring an input voltage at an input side of the OBC controller when an external charger supplies power as the first switch is closed, setting a charging start time based on the measured input voltage, and starting charging of the battery when the charging start time is reached.

According to another aspect of the present disclosure, there is provided a vehicle including an electric motor for driving wheels, a battery for supplying power to the motor, and a on-board charger (OBC) controller for closing a first switch when reserved charging is set, measuring an input voltage at an input side thereof when an external charger supplies power, setting a charging start time based on the measured input voltage, and starting charging of the battery when the charging start time is reached.

At least one embodiment of the present disclosure includes the following effects:

In a vehicle, more efficient reserved charging may be performed.

In particular, when a reserved charging function is used, since an estimated charging time is calculated through actual voltage measurement without actual charging, it is possible to increase the lifespan of a charger and to make the best use of a time at which a cheap electricity rate is applied.

The aspects of the present disclosure are only some of the embodiments of the present disclosure, and various embodiments based technical features of the present disclosure may be devised and understood by one of ordinary skill in the art based on the detailed description of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principles of the disclosure. In the drawings:

FIGS. 4A and 4B are diagrams showing examples of a process of performing charging according to an input voltage when applying a charging control method according to embodiments of the present disclosure;

FIGS. 9A to 9C are diagrams illustrating examples of a logic for determining an estimated charging time according to an embodiment of the present disclosure.

DETAILED DESCRIPTION OF THE DISCLOSURE

Reference will now be made in detail to embodiments of the present disclosure, examples of which are illustrated in the accompanying drawings. Wherever possible, the same reference numbers will be used throughout the drawings to refer to the same or like parts, and a repeated description thereof will be omitted. The suffixes "module" and "unit" of elements herein are used for convenience of description and thus can be used interchangeably and do not have any distinguishable meanings or functions.

In describing the embodiments of the present disclosure, if it is determined that the detailed description of a related known function or construction renders the scope of the present disclosure unnecessarily unclear, the detailed description thereof will be omitted. In addition, the accompanying drawings are provided only for a better understanding of the embodiments disclosed in the present specification and are not intended to limit technical concepts disclosed in the present specification. Therefore, it should be understood that the accompanying drawings include all modifications, equivalents and substitutions within the scope and sprit of the present disclosure.

In addition, in the present specification, the term "battery" may refer to a battery for supplying power to an electric motor, not to a 12-V battery used to operate an electrical apparatus of a general vehicle, unless otherwise stated.

Prior to a description of a vehicle charging system according to embodiments of the present disclosure, a general vehicle charging system will be described with reference to FIG. 1.

Figure 1:
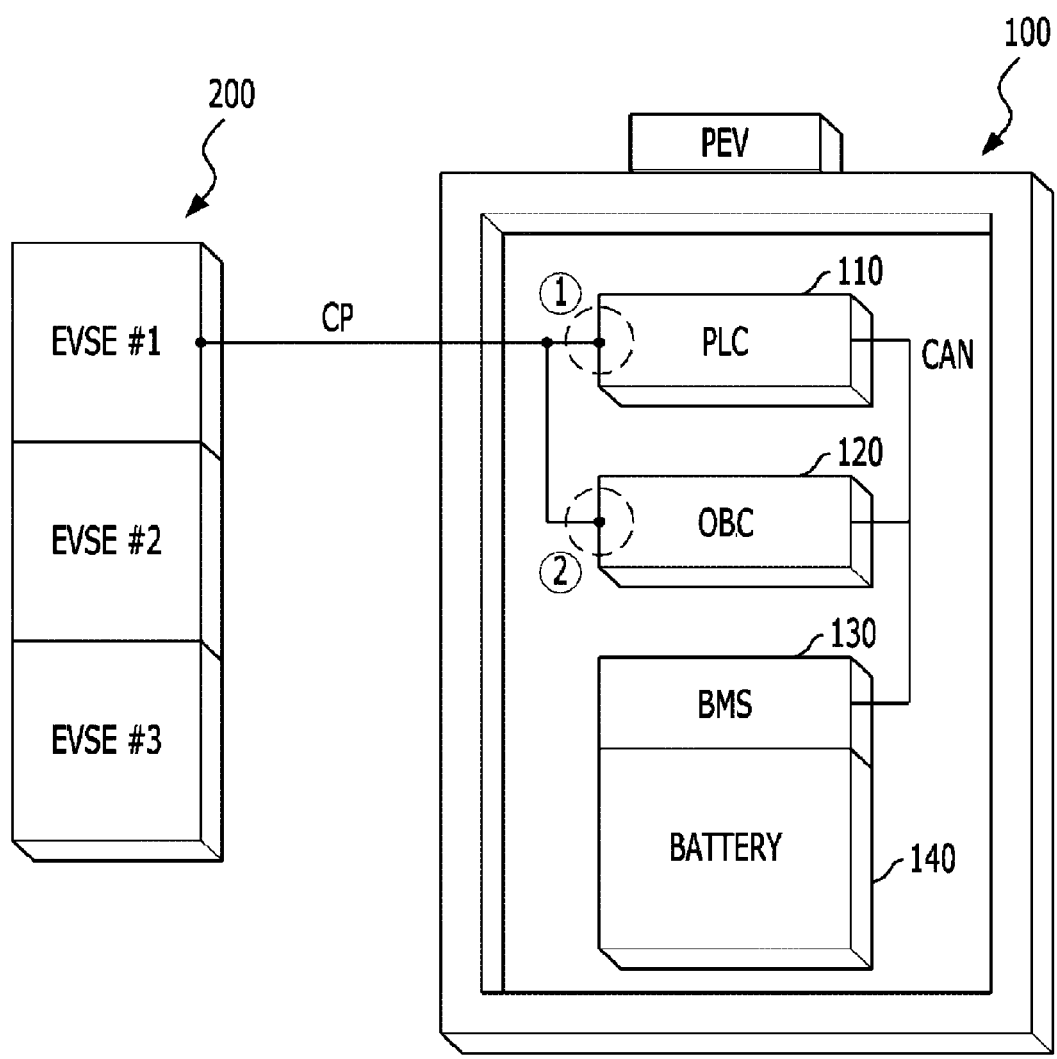
FIG. 1 is a diagram showing an example of a charging system structure of a vehicle according to embodiments of the present disclosure.

FIG. 1 is a diagram showing an example of a general charging system.

Although a charging system of an electric vehicle (EV) or a plug-in electric vehicle (PEV) is shown in FIG. 1, the charging system of FIG. 1 is similarly applicable to a PHEV except for parts related to an engine driven using a fossil fuel.

Referring to FIG. 1, the charging system 100 of the EV may include a power line communication (PLC)/electric vehicle communication controller (EVCC) 110 for controlling quick charging, an on-board charger (OBC) controller 120 for controlling slow charging, a battery management system 130 and a battery 140.

The EVCC, the OBC controller and the BMS may be connected to each other through controller area network (CAN) communication. In addition, the charging system 100 may be connected to a charger (electric vehicle supply equipment (EVSE)) 200 via a charging connector. The charger 200 may transmit a pulse width modulation (PWM) signal to a vehicle via a control pilot (C/P) line and the vehicle may determine whether slow charging or quick charging is to be performed through a duty ratio of the PWM signal (that is, a ratio of the H signal and L signal of the pulse width).

A process of performing general reserved charging based on the above-described configuration of the system will be described with reference to FIG. 2.

Figure 2:
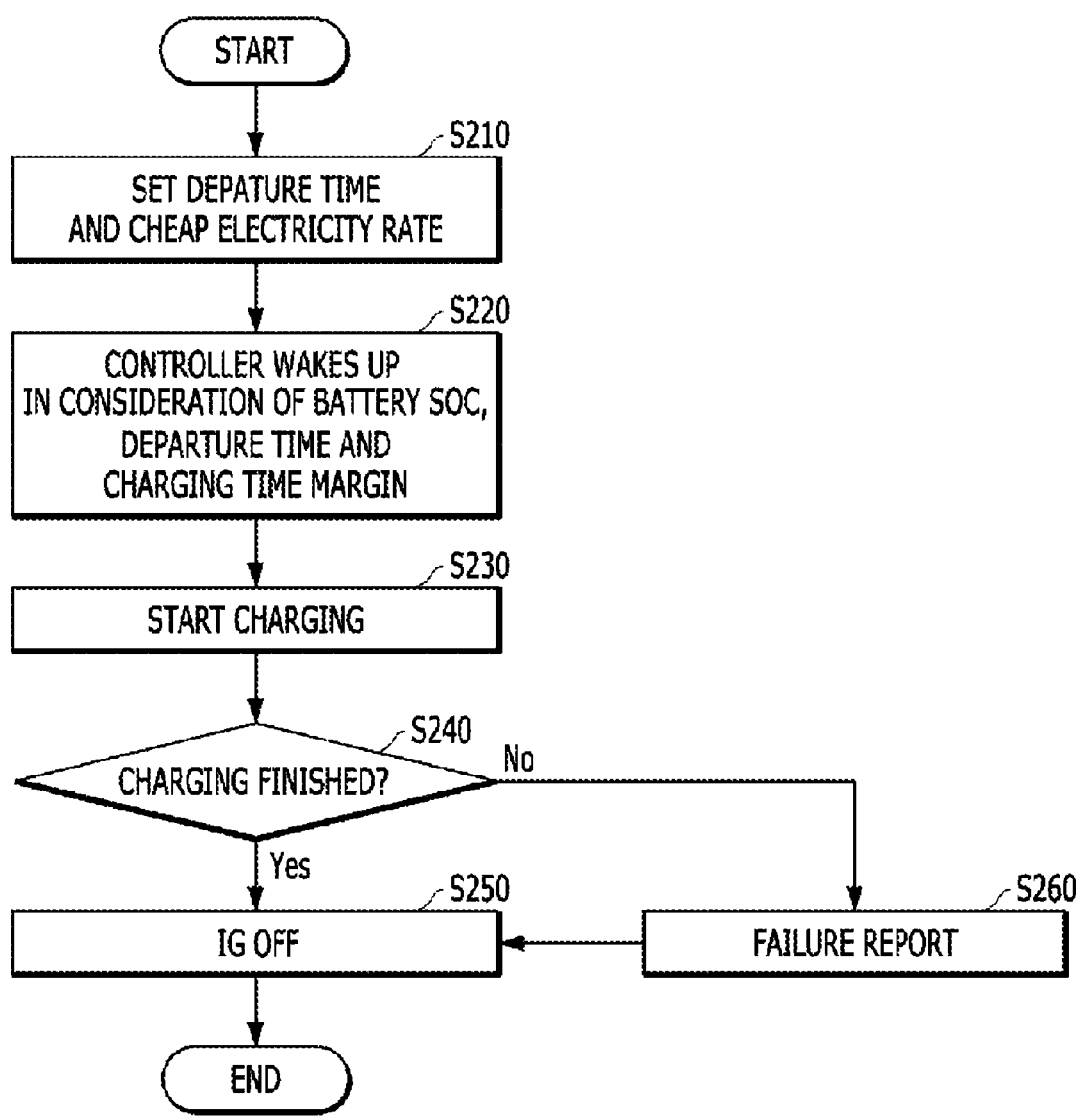
FIG. 2 is a flowchart illustrating an example of a process of performing a general reserved charging function according to embodiments of the present disclosure.

FIG. 2 is a flowchart illustrating an example of a process of performing general reserved charging according to an embodiment of the present disclosure.

Referring to FIG. 2, as a driver inputs a departure time and sets a cheap, or relatively cheap electricity rate compared with a more expensive electricity rate, electricity rate for using late night electricity (S210), the charging start time of the vehicle may be determined in consideration of a current state of charge (SOC) of a battery, the input departure time and a change margin of a maximum charging time according to the current SOC. The OBC controller may sleep until the charging start time and wake up at the charting start time (S220). Here, wake-up of the OBC controller may mean that the vehicle is switched to an IG-ON state.

The OBC controller may wake up to start charging (S230) and, when charging is finished (S240), the vehicle may be switched to an IG-OFF state (S250). If charging up to a prescribed target charging amount (hereinafter, full charging is assumed for convenience) fails, a failure report message may be transmitted to a prescribed apparatus or a failure report procedure such as error code output may be performed (S260).

Here, the departure time and the cheap rate may be input through a user interface provided in the vehicle using an AVN (audio-video-navigation) system or may be received from an external device through the charger or a telematics server.

In the above-described process, although a marginal time is applied according to SOC, since the charging start time may be determined on the assumption that the input current and voltage of the charger are predetermined values, full charging may fail if the estimated voltage of the charger and the actual voltage of the charger are different. For example, although the charging start time may be set to a relatively late time on the assumption that the input voltage of the charger is 220 V, the actual input voltage of the charger may be 110V and thus full charging may not be accomplished by the departure time. In contrast, although the charging start time may be set to a relatively early time on the assumption that the input voltage of the charger is 110 V, the actual voltage of the charger may be 220V and thus charging may start before a time when the electricity rate is discounted. Therefore, the electricity rate cannot be discounted.

In one embodiment of the present disclosure, with the assumption that the input voltage of the charger is a minimum value, the charging start time may be calculated. When charging starts at the charging start time, actual input voltage and current are measured to measure a charging power of the charger. The charging start time may be reset based on the measured charging power of the charger.

According to one aspect of the present embodiment, if it is assumed that the input voltage of the charger includes 110 V and 220 V, a minimum voltage is 110 V. Of course, this is merely exemplary and more or fewer types of voltages may exist according to a country or region and a smallest voltage may be used as the input voltage of the charger. The input voltage of the charger may be directly measured in the OBC controller upon starting charging. In some cases, the input current may be directly measured in the OBC controller and, in such a case, a method of estimating the input voltage depending on whether the input current is greater or less than a threshold is applicable.

In addition, according to one aspect of an embodiment, the input current may be estimated through a CP duty cycle. To this end, a reference table (or map) indicating correspondence between CP duty cycle and input current may be used. The reference table may be prestored in the OBC controller.

In addition, according to one aspect of an embodiment, the charging start time may be calculated by subtracting a predetermined margin and an estimated charging time from the departure time. Here, the estimated charging time may be calculated by dividing a battery capacity by a value obtained by multiplying the input voltage, the input current and the charging efficiency of the OBC controller.

According to one aspect of an embodiment, after the charging start time is set on the assumption of a low voltage (e.g., 110 V), charging may start at the charging start time. At this time, when the sensed voltage is a high voltage (e.g., 220 V), the OBC controller may recalculate the charging time based on the high voltage. At this time, if it is determined that full charging is possible until a prescribed departure time when charging starts at a time at which a cheap electricity rate is applied, the OBC controller may reset the charging start time to a time when the cheap electricity rate starts or a subsequent time therefrom. In this case, the OBC controller may perform low-load charging until the reset charging start time in order to reduce charging costs, and start normal-load charging when the reset charging start time is reached.

Figure 3:
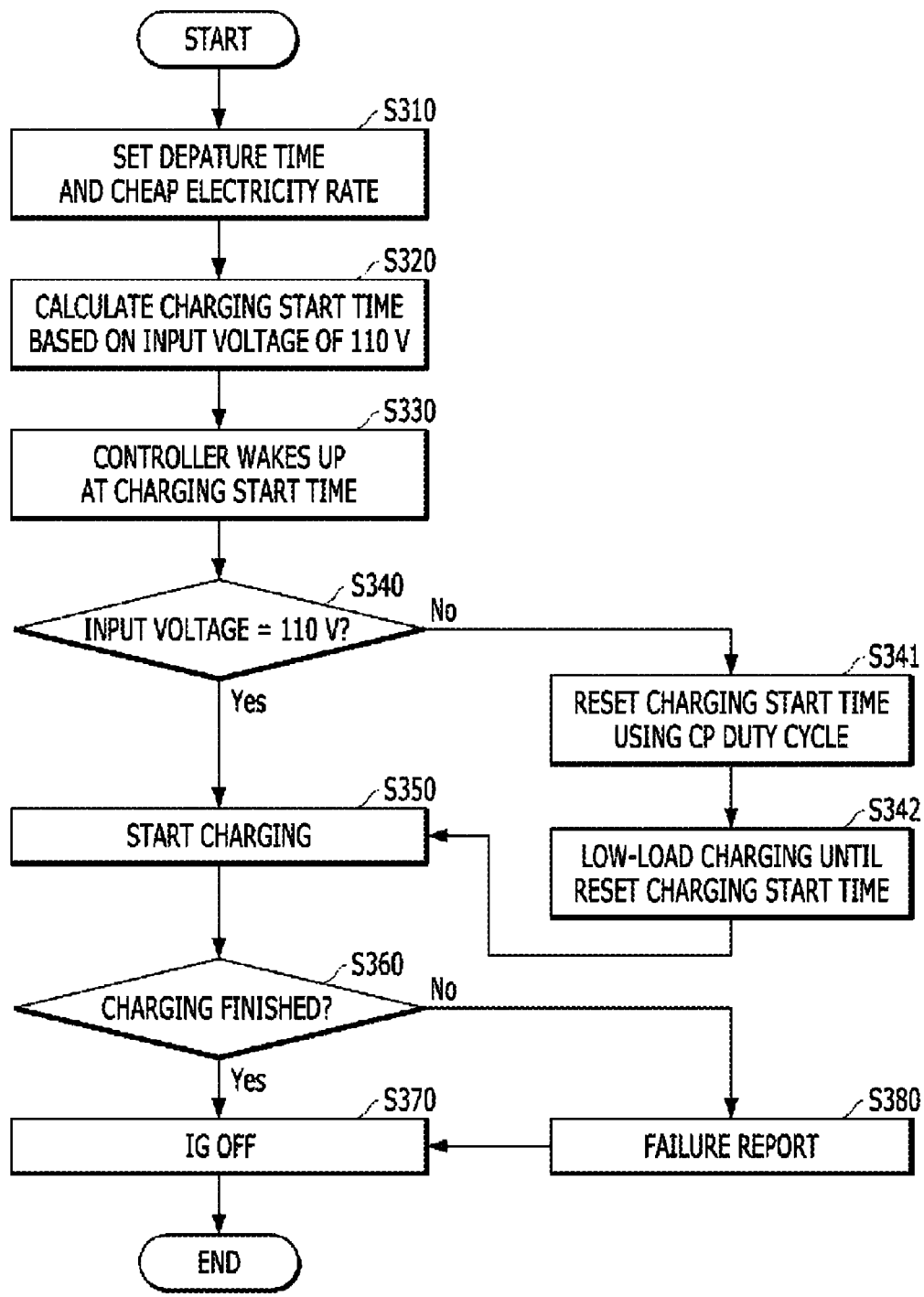
FIG. 3 is a flowchart illustrating an example of an efficient charging control process in a vehicle according to an embodiment of the present disclosure.

A flowchart of a charging control method according to the present embodiment is shown in FIG. 3.

FIG. 3 is a flowchart illustrating an example of an efficient charging control process in a vehicle according to one embodiment of the present disclosure. In FIG. 3, it is assumed that the minimum value of the input voltage is 110 V and the maximum value of the input voltage is 220 V.

Referring to FIG. 3, first, a departure time may be input by a driver and reserved charging using a cheap electricity rate may be set (S310).

The OBC controller may calculate a charging start time on the assumption that the input voltage of the charger is 110 V (S320). Here, the current SOC of the battery may be considered.

The OBC controller may stand by in a sleep mode until the charging start time, wake up at the charging start time (S330) to start charging, and measure the input voltage (S340). When the input voltage is 110 V, the OBC controller may start charging without change (S350). When charging is finished (S360), the vehicle may be switched to the IG-OFF state (S370).

A failure report procedure S380 performed when charging fails may be similar to step S260 of FIG. 2 and thus a detailed description thereof will be omitted.

If the input voltage is not 110 V (e.g., 220 V), the OBC controller may obtain charging power using the input voltage and the current estimated through the CP duty cycle and recalculate and reset the charging start time using the charging power (S341). At this time, as described above, when the charging start time is recalculated, the time at which the cheap electricity rate is applied may be considered.

When the charging start time is reset, the OBC controller may stand by while performing low-load charging until the reset charging start time (S342) and then start normal charging when the reset charging start time is reached (S350).

Next, a process of performing charging when the above-described charging control method is applied will be described with reference to FIG. 4.

FIGS. 4A and 4B are diagrams showing examples of a process of performing charging according to an input voltage when applying a charging control method according to an embodiment of the present disclosure.

In FIG. 4A, it may be assumed that the actual input voltage of the charger is 110 V.

Referring to FIG. 4A, when the connector of the charger is connected and the departure time and the cheap electricity rate are set, the OBC controller may determine the charging start time on the assumption that the input voltage is 110 V. At this time, if the estimated charging time ② is sufficiently included in a time obtained by subtracting a margin ③ before the departure time from a period of time ②+③ when the electricity rate is cheap, the OBC controller may determine the charting start time as being within the period of time when the electricity rate is cheap. The OBC controller in the sleep mode during a period ① before the charging start time may start charging when the charging start time is reached. If the estimated voltage and the actual voltage are equal, charging may immediately start.

In FIG. 4B, it may be assumed that the actual voltage of the charger is 220 V.

Referring to FIG. 4B, when the connector of the charger is connected and the departure time and the cheap electricity rate are set, the OBC controller may determine the charging start time on the assumption that the input voltage is 110 V. At this time, if an estimated charting time ②+③ is not included in a period of time ③+④ when the electricity rate is cheap in consideration of a margin a before the departure time, the OBC controller may set the charging start time to a time before the electricity rate is cheap, in consideration of the departure time and the margin. The OBC controller in the sleep mode during a period ① before the charging start time may start charging when the charging start time is reached. If the estimated voltage and the actual voltage are different, the charging start time may be reset using the actual voltage and the current estimated through the CP duty cycle. Thereafter, low-load charging may be performed during the period of time ② remaining until the reset charging start time. The OBC controller may start charging when the reset charging start time is reached.

The general OBC controller may include a booster (BS) which may be an input terminal and a zero voltage switching (ZVS) full-bridge PWM circuit which may be an output terminal, which may be implemented through simple control and using a relatively small number of parts. However, in some cases, ZVS of the output terminal may fail upon low-load charging, causing switching loss and, in a particular case, stopping OBC operation. This may leads to a deterioration in charging efficiency.

In another embodiment of the present disclosure, if low-load charging is performed according to a resetting of the charging start time, a method of turning only the output terminal of the OBC controller off during the low-load charging period may be implemented. That is, the charger may supply power to the input terminal of the OBC controller when the first calculated charging start time is reached but the output terminal of the OBC controller may be turned off until the reset charging start time, such that the battery may not be actually charged.

Figure 5:
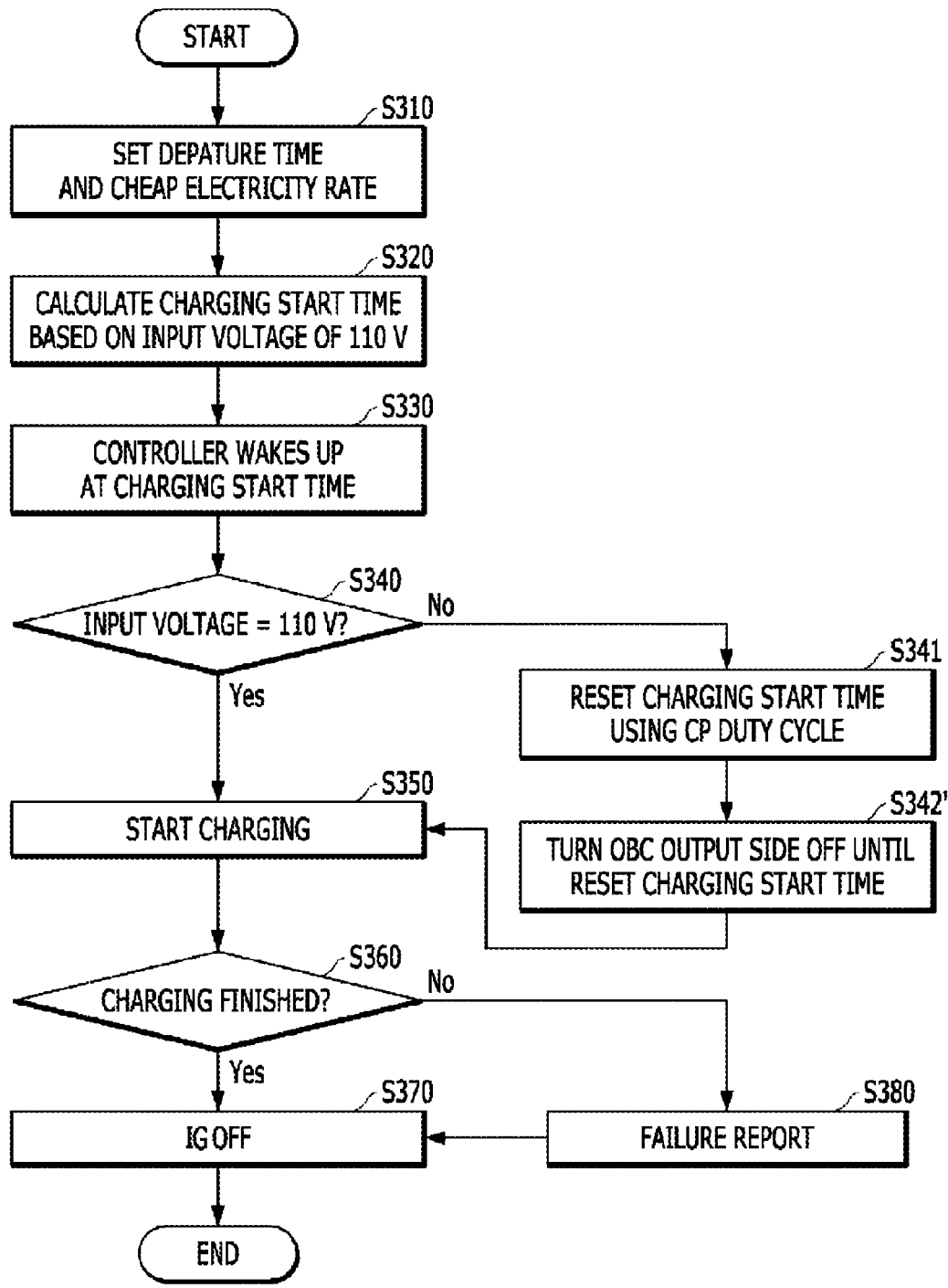
FIG. 5 is a flowchart illustrating an example of an efficient charging control process in a vehicle according to another embodiment of the present disclosure.

The flowchart of this operation is shown in FIG. 5.

FIG. 5 is a flowchart illustrating an example of an efficient charging control process in a vehicle according to an embodiment of the present disclosure.

In FIG. 5, it may be assumed that the minimum value of the input voltage is 110 V and the maximum value of the input voltage is 220 V. FIG. 5 is similar to FIG. 3, except for step S342' and a repeated description of similar steps will be omitted for clarity.

Referring to FIG. 5, when the charging start time is reset due to a difference between an estimated input voltage and an actual input voltage (S341), the OBC controller may turn the output terminal off until the reset charging start time (S342'). When the reset charging start time is reached, the OBC controller may activate the output terminal (ON) to start charging (S350).

According to the above-described embodiments of the present disclosure, it is possible to reduce charging costs by making the best use of a reserved charging function in consideration of the departure time and the cheap electricity rate. In addition, it is possible to increase a rate of success of full charging by estimating the charging time based on actual measurement, to make the best use of a cheap electricity rate and to unify a charging logic regardless of charger type (input voltage/country/method). If the output terminal of the OBC controller is temporarily turned off, it is possible to reduce energy loss due to stopping of OBC operation upon low-load charging and to increase durability of the OBC controller.

In the above-described embodiments, when the first calculated charging start time is reached, the OBC controller may operate to perform charging in order to actually measure the input voltage of the charger. Accordingly, if the difference between the estimated input voltage and the actually measured input voltage is frequently generated, a relay may be frequently used according to the configuration of the OBC controller, thereby possibly reducing a lifespan of the power element.

Accordingly, in another embodiment of the present disclosure, a method of measuring an input voltage without performing actual charging and more accurately estimating input current is proposed.

According to one aspect of an embodiment, an internal switch of the OBC controller may be used to measure the input voltage without actual charging. The internal switch may supply power to the vehicle when turned on if charging is performed using a charger (in particular, EVSE) which does not supply electricity upon connecting the connector. A representative example of such a switch includes an "S2" switch. The position of the S2 switch will be described with reference to FIG. 6.

Figure 6:
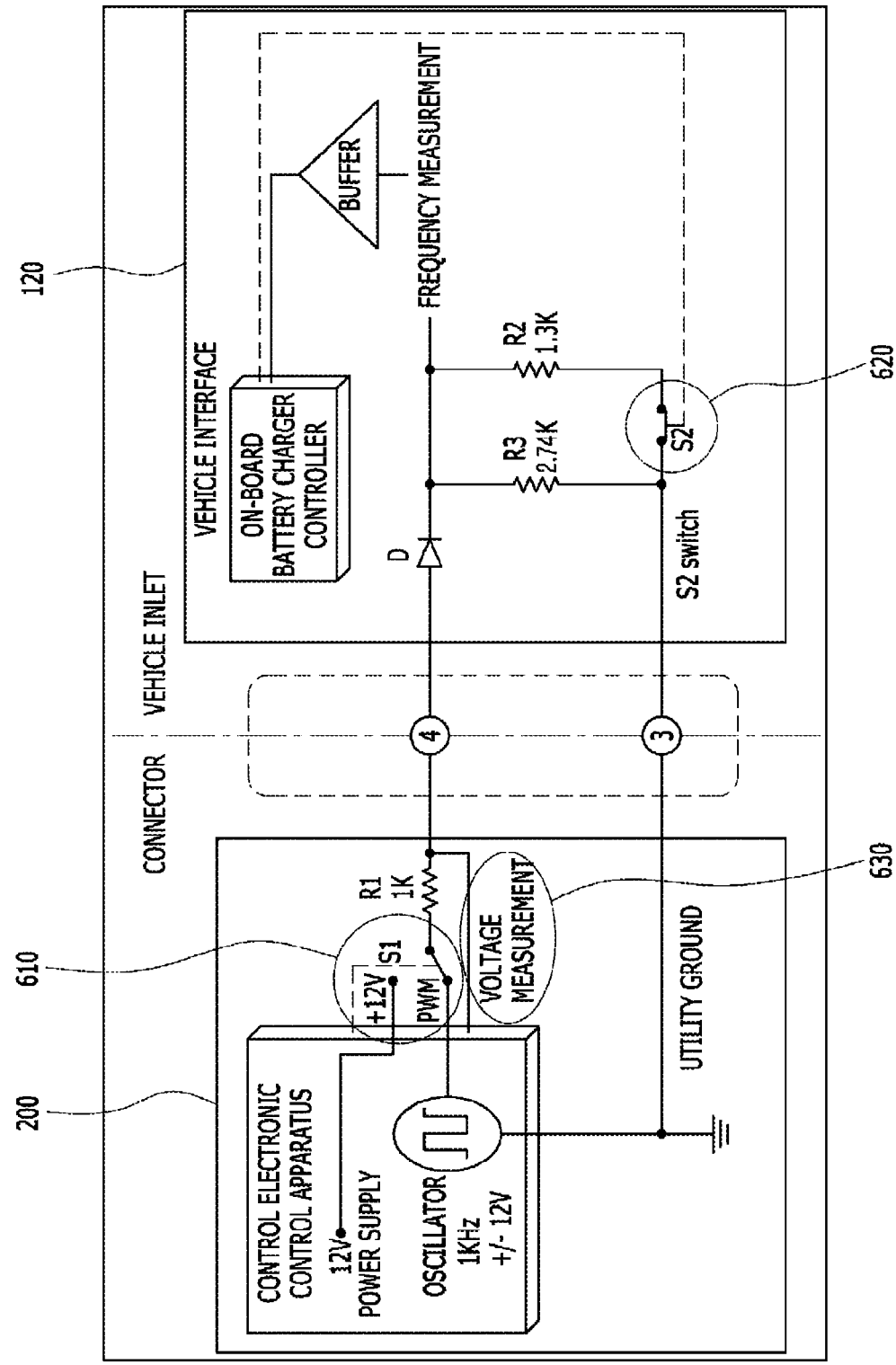
FIG. 6 is a diagram illustrating a switch provided at a side of an on-board charger (OBC) controller applied to another embodiment of the present disclosure.

FIG. 6 is a diagram illustrating a switch provided at a side of an OBC controller applied to an embodiment of the present disclosure.

Referring to FIG. 6, the charger (EVSE) 200 may include an S1 switch 610 and the vehicle-side OBC controller 100 may include an S2 switch 620. As the S2 switch 620 is turned on/off, the resistance of a closed circuit formed between the EVSE 200 and the OBC controller 120 may be changed. That is, when the S2 switch 620 is opened, the equivalent resistance of the closed circuit (hereinafter, referred to as a "CP circuit", for convenience) may become R1+R3 and, when the S2 switch is closed, R2 and R3 may be connected in parallel to change the equivalent resistance. Such resistance change may change a CP voltage measured in an R1 end 630 of the EVSE. When the voltage is changed, the S1 switch 610 of the EVSE 200 may operate to deliver power to the OBC controller 120.

The OBC controller may include a rectifier located at an input side, a power factor correction circuit located at a middle side and a DC/DC converter located at an output side. In the CP circuit, when the S2 switch is closed, the resistance of the vehicle-side circuit may be changed and the CP voltage measured in the EVSE may be changed, such that the charger may output the changed voltage. At this time, the voltage may be applied to the input side (that is, the rectifier) of the OBC controller and may be measured to confirm the input voltage of the OBC controller. Accordingly, it is possible to measure the input voltage by turning the S2 switch on in a state in which the OBC controller does not perform charging operation.

As a result, the S2 switch may change the equivalent resistance of the vehicle when the closed circuit formed between the charger and the OBC controller is turned on to change the voltage measured in the charger such that the charger starts to supply power to the vehicle. Since change in an on/off state of this switch does not change (or reset) the state related to payment in the general charger (EVSE), even when this switch is turned on to check the input voltage and then is turned off, the payment state of the charger may not be changed. Therefore, a user can be prevented from inconveniently inputting charging related settings to the charger again.

Figure 7:
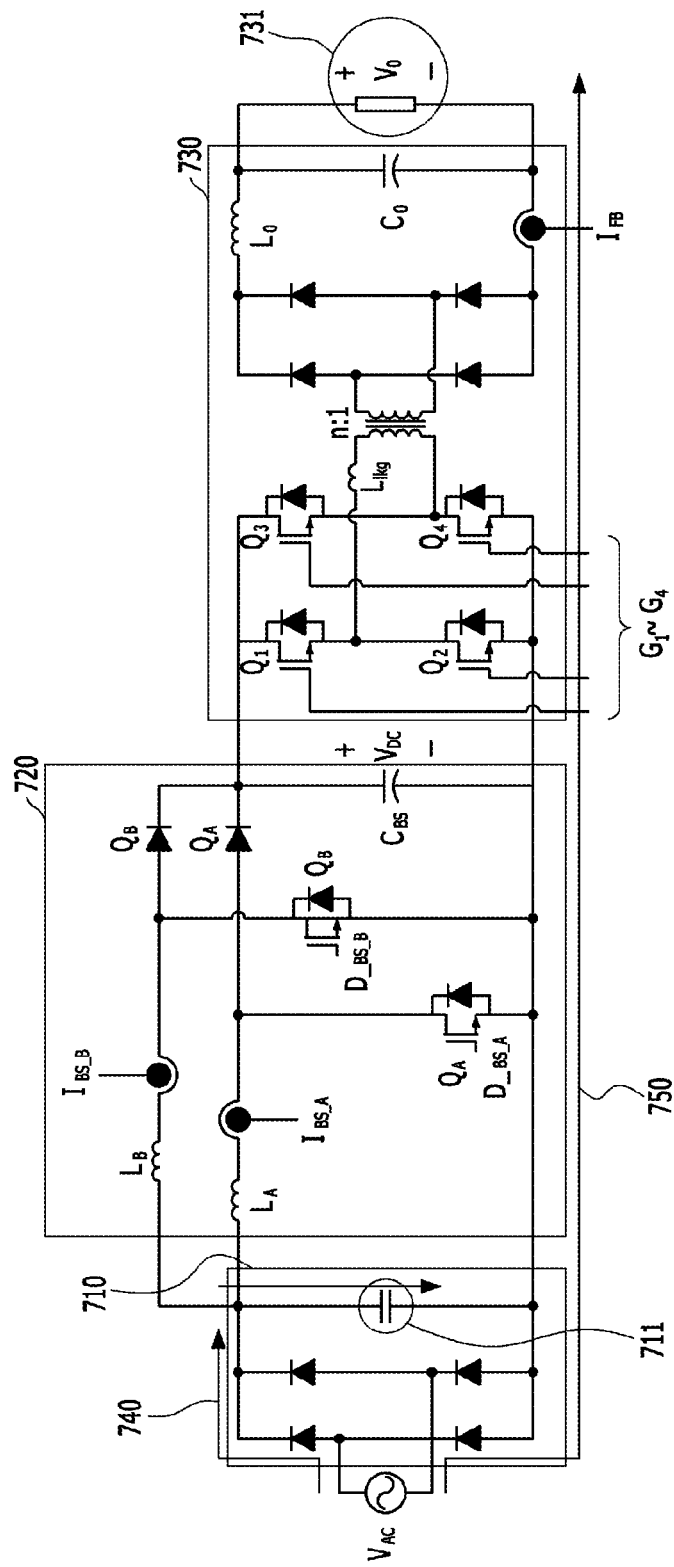
FIG. 7 is a circuit diagram illustrating a vehicle-side charger structure according to an embodiment of the present disclosure and an input voltage measurement method using a switch according to embodiments of the present disclosure.

A structure of an OBC controller and an input voltage measurement according to S2 switch ON are shown in FIG. 7.

FIG. 7 is a circuit diagram illustrating a vehicle-side charger structure according to an embodiment of the present disclosure and an input voltage measurement method using a switch.

Referring to FIG. 7, the OBC controller may include a rectifier 710 located at an input side, a power factor correction circuit 720 located at a middle side and a DC/DC converter 730 located at an output side. When only the S2 switch operates, that is, when a charging operation is not performed, the flow of power may be limited to the rectifier as shown in an upper arrow 740. In this process, since the input voltage may be applied to the capacitor 711 of the rectifier 710, the actual input voltage may be obtained by measuring the voltage applied to the capacitor.

When general charging is performed, power may be delivered to the output side as shown in a lower arrow 750 and the actual input voltage may be measured using a method of measuring Vo 731.

Even when the input voltage is measured using the S2 switch, it may be difficult to measure input current. Accordingly, input current may be estimated using the CP duty cycle. In an embodiment, a method of estimating input current in order to increase a buffering probability will be described with reference to FIGS. 8A and 8B.

Figure 8A:
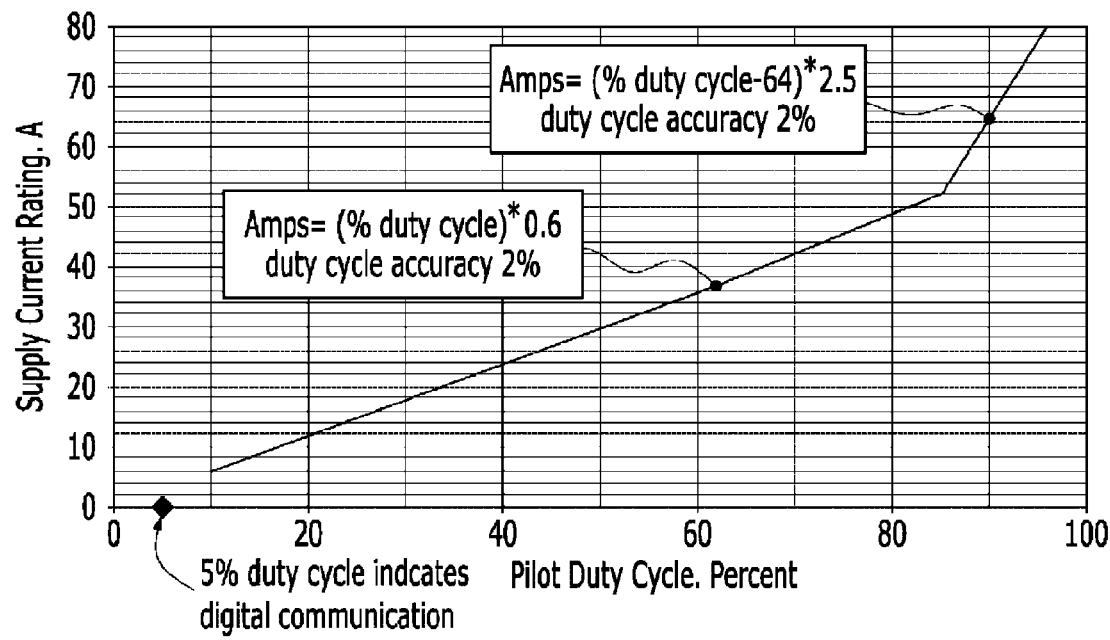
FIGS. 8A and 8B are diagrams illustrating an input current estimation method according to an embodiment of the present disclosure.
Figure 8B:
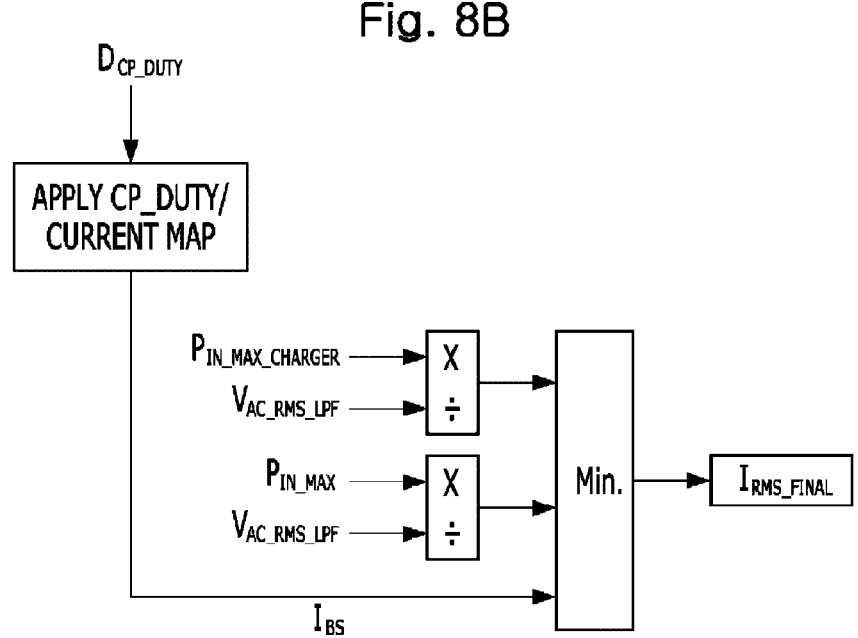

FIGS. 8A and 8B are diagrams illustrating an input current estimation method according to an embodiment of the present disclosure.

Referring to FIG. 8A, correspondence between CP duty cycle and input current may be predefined, or represented, in the form of a graph. The OBC controller may estimate input current using a method of referring to the graph or to a table/map corresponding thereto using the detected CP duty cycle.

In order to increase the buffering probability, the input current value may be low within a reasonable range. Accordingly, in an embodiment, as shown in FIG. 8B, a minimum value $I_{RMS\_FINAL}$ of the values obtained by respectively dividing maximum power $P_{IN\_MAX\_CHARGER}$ of the charger and maximum power $P_{IN\_MAX}$ of the OBC controller by the measured input voltage $V_{AC\_RMS\_LPF}$ of the OBC controller and current $I_{BS}$ estimated using the CP duty cycle $D_{CP\_Duty}$ may be used to calculate an estimated charging time.

Figure 9A:
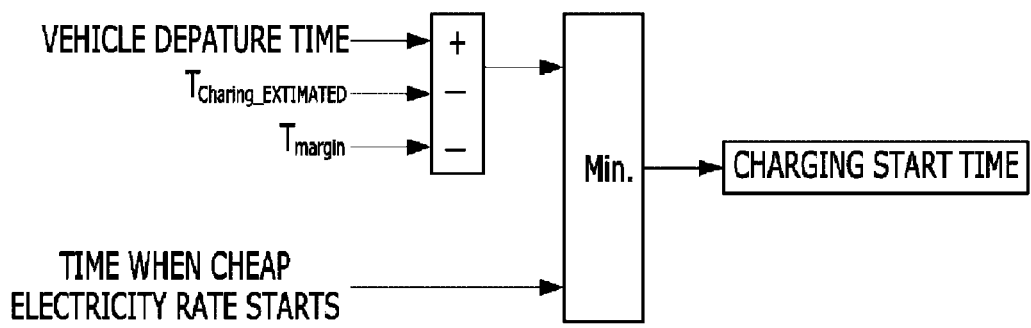
Figure 9B:
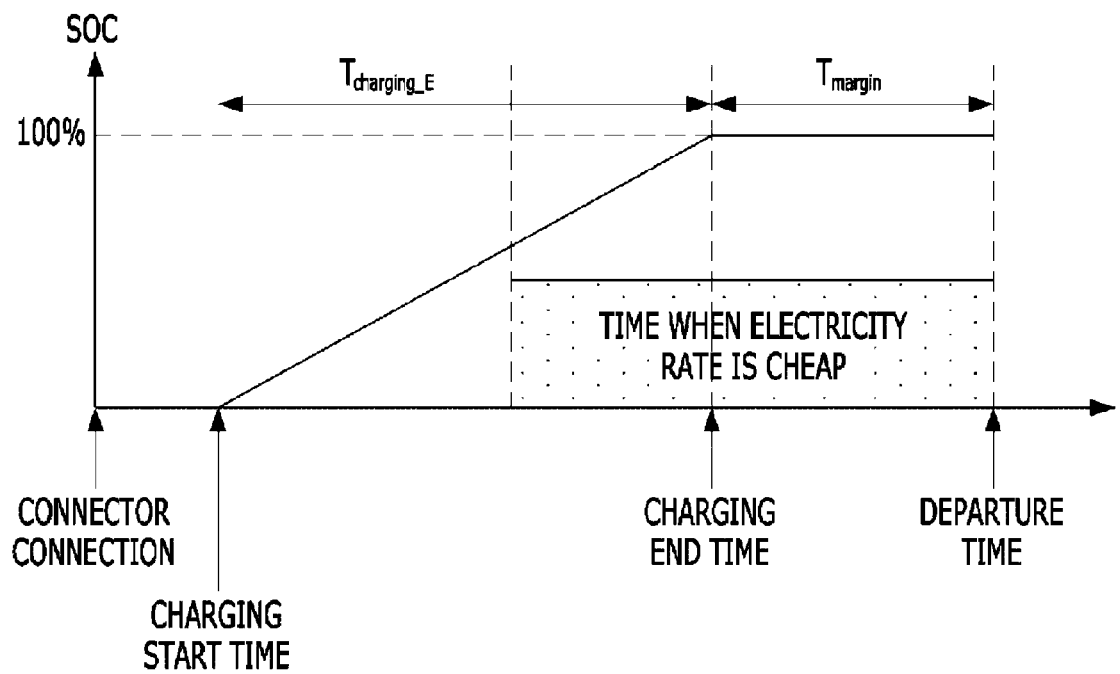

In addition, the charging start time using the estimated charging time may be determined as shown in FIGS. 9A to 9C. FIGS. 9A to 9C are diagrams showing an example of a logic for determining an estimated charging time according to an embodiment of the present disclosure.

Referring to FIG. 9A, the charging start time may be determined in consideration of a time obtained by subtracting the estimated charging time $T_{charging\_ESTIMATED}$ and a predetermined margin $T_{margin}$ from the vehicle departure time and a time when a cheap electricity rate starts. More specifically, when the time obtained by subtracting the estimated charging time $T_{charging\_ESTIMATED}$ and the predetermined margin $T_{margin}$ from the vehicle departure time is earlier than a time at which the cheap electricity rate is applied, as shown in FIG. 9B, the charging start time may be set to be a time before the cheap electricity rate starts. In contrast, when the time obtained by subtracting the estimated charging time $T_{charging\_ESTIMATED}$ and the predetermined margin $T_{margin}$ from the vehicle departure time is later than a time at which the cheap electricity rate is applied, as shown in FIG. 9C, the charging start time may be set to be a time when the cheap electricity rate starts.

Figure 10:
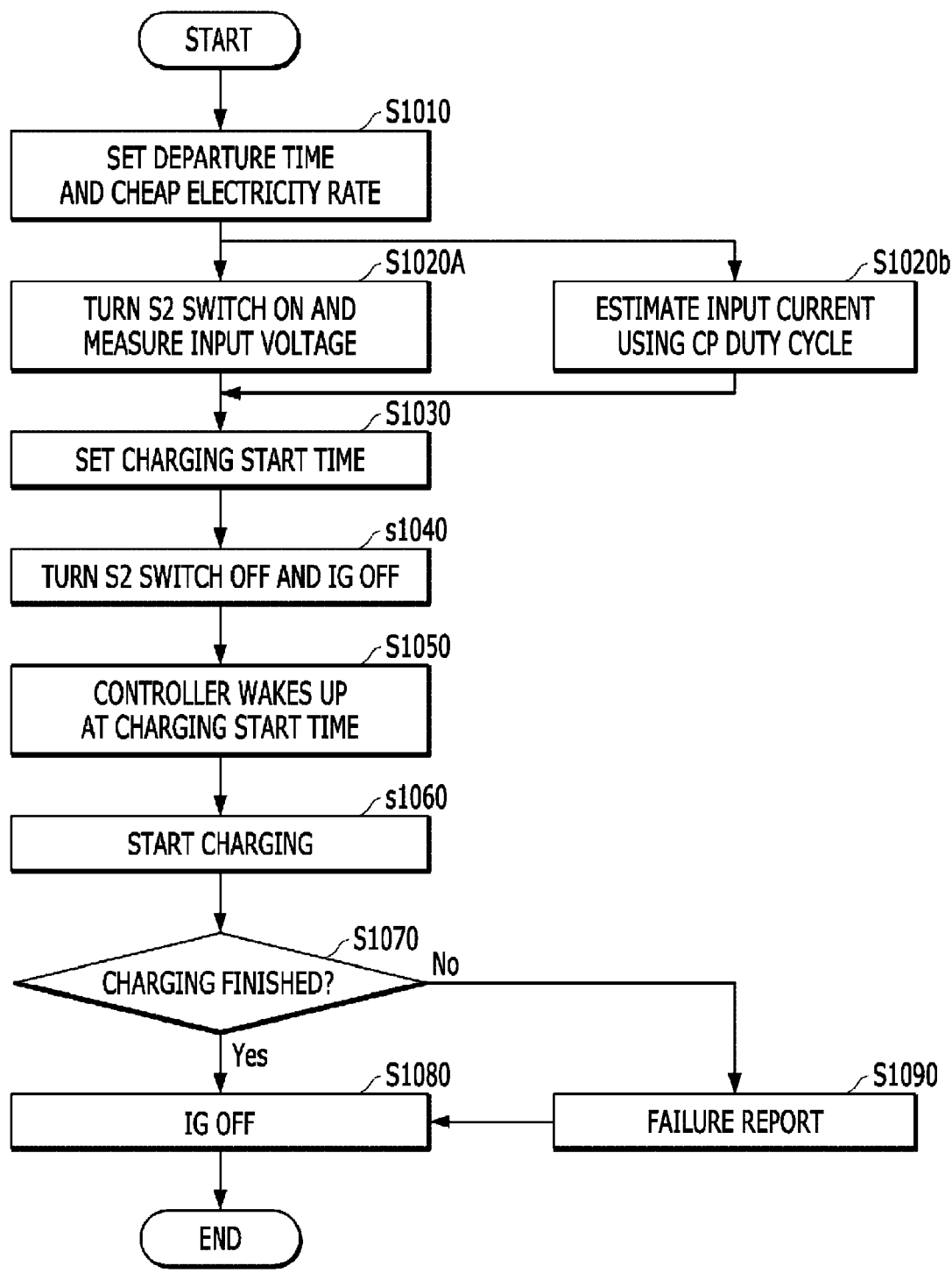
FIG. 10 is a flowchart illustrating an example of an efficient charging control process in a vehicle according to an embodiment of the present disclosure.

A charging control method according to this embodiment is shown in FIG. 10. FIG. 10 is a flowchart illustrating an example of an efficient charging control process in a vehicle according to an embodiment of the present disclosure.

Referring to FIG. 10, first, the departure time may be input by the driver and reserved charging using a cheap electricity rate may be set (S1010).

The OBC controller may measure the input voltage applied to the input side of the OBC controller by turning the S2 switch on (S1020A). At this time, since the OBC controller may turn only the S2 switch on and may not activate a charging function, power may not be output to the BMS through the middle side and output side of the OBC controller.

In addition, the OBC controller may estimate input current using the CP duty cycle (1020B), to which the process described with reference to FIG. 8 may be applicable.

When voltage measurement and current estimation are finished, the charging start time may be set (S1030), to which the process described with reference to FIG. 9 may be applicable.

When charging start time settings are finished, the OBC controller may turn the S2 switch off to operate in a sleep state (that is, IG OFF) until the charging start time (S1040) and then wake up at the charging start time (S1050) to start charging (S1060).

When charging is finished (S1070), the vehicle may be turned to the IG OFF state (S1070). The failure report procedure 51090 performed when charging fails is similar to step S260 described with reference to FIG. 2 and a detailed description thereof will therefore be omitted.

According to the above-described embodiments of the present disclosure, since another charging process is not performed before a final charging operation, it is possible to ensure relay robustness and to prevent the lifespan of the power element from being decreased. In addition, since the charging time is more stably estimated, it is possible to increase a full charging possibility while maximizing the use of a cheap electricity rate. In addition, in a general charging control method, after charging starts, the vehicle cannot be switched to the IG OFF state. This is because, when the vehicle is switched to the IF OFF state, the payment state of the charger is reset and thus the driver makes payment again. However, when the S2 switch is turned on/off, the payment state of the charger is not changed. Therefore, charging can be performed without making payment again and the vehicle can be switched to the IG OFF state before starting charging. Accordingly, reserved charging efficiency is increased.

The present disclosure may be implemented as code that can be written to, or implemented by, a computer-readable recording medium and can thus be read by a processor. The computer-readable recording medium may be any type of recording device in which data can be stored in a computer-readable manner. Examples of the computer-readable recording medium include a hard disk drive (HDD), a solid state drive (SSD), a silicon disk drive (SDD), ROM, a RAM, a CD-ROM, a magnetic tape, a floppy disk, an optical data storage, and a carrier wave (e.g., data transmission over the Internet).

The above detailed description is not to be construed as limiting the present disclosure in all aspects and should be considered as being merely exemplary. The scope of the present disclosure should be determined by reasonable interpretation of the accompanying claims and all equivalent modifications made without departing from the present disclosure should be included in the following claims.

What is claimed is:

1. A charging control method of a vehicle, the charging control method comprising:
    setting a reserved charging;
    closing a first switch in an on-board charger (OBC) controller;
    measuring an input voltage at an input side of the OBC controller when an external charger supplies power when the first switch is closed;
    setting a charging start time based on the measured input voltage; and
    starting charging a battery when the charging start time is reached.

2. The charging control method according to claim 1, further comprising opening the first switch when the step of measuring an input voltage is finished.

3. The charging control method according to claim 1, wherein the step of setting reserved charging includes setting a departure time and using a late night electricity rate.

4. The charging control method according to claim 3, further comprising estimating an input current using a control pilot duty cycle.

5. The charging control method according to claim 4, wherein the step of setting a charging start time includes:
    calculating an estimated charging time using the measured input voltage and the estimated input current; and
    determining the charging start time in consideration of the calculated estimated charging time, the departure time, a time at which the late night electricity rate is applied and a predetermined margin.

6. The charging control method according to claim 5, wherein the step of determining the charging start time is performed such that the estimated charging time is maximized within the time at which the late night electricity rate is applied.

7. The charging control method according to claim 4, wherein the step of estimating an input current includes:
    applying a control pilot duty cycle to a prescribed current map to acquire a first current;
    acquiring a second current using a maximum power of the external charger and the measured input voltage;
    acquiring a third current using a maximum power of the OBC controller and the measured input voltage; and
    determining a lowest value of the first current, the second current and the third current as the input current.

8. The charging control method according to claim 1, further comprising the vehicle standing by in a start-up off (IG OFF) state until the charging start time after the charging start time is set.

9. The charging control method according to claim 1, wherein:
the first switch changes an equivalent resistance of the OBC controller upon operation of a closed circuit formed between the external charger and the OBC controller, and
the OBC controller does not output power to an output side even when the external charger supplies power as the first switch is closed.

10. The charging control method according to claim 9, wherein the external charger supplies charging power to the OBC controller when a voltage change due to a change in the equivalent resistance is detected.

11. A vehicle comprising:
an electric motor for driving wheels;
a battery for supplying power to the electric motor; and
an on-board charger (OBC) controller for closing a first switch when a reserved charging is set, measuring an input voltage at an input side thereof when an external charger supplies power, setting a charging start time based on the measured input voltage, and starting charging the battery when the charging start time is reached.

12. The vehicle according to claim 11, wherein the OBC controller controls opening the first switch when a measurement of the measuring an input voltage is finished.

13. The vehicle according to claim 11, wherein the reserved charging is set along with a departure time and use a late night electricity rate.

14. The vehicle according to claim 13, wherein the OBC controller estimates an input current using a control pilot duty cycle.

15. The vehicle according to claim 14, wherein the OBC controller calculates an estimated charging time using the measured input voltage and the estimated input current, and determines the charging start time in consideration of the calculated estimated charging time, the departure time, a time at which the late night electricity rate is applied and a predetermined margin.

16. The vehicle according to claim 15, wherein the OBC controller determines the charging start time such that the estimated charging time is maximized within the time at which the late night electricity rate is applied.

17. The vehicle according to claim 14, wherein the OBC controller applies a control pilot duty cycle to a prescribed current map to acquire a first current, acquires a second current using a maximum power of the external charger and the measured input voltage, acquires a third current using a maximum power of the OBC controller and the measured input voltage, and determines a lowest value of the first current, the second current and the third current as the input current.

18. The vehicle according to claim 11, wherein the vehicle stands by in a start-up off (IG OFF) state until the charging start time after the charging start time is set.

19. The vehicle according to claim 11, wherein the first switch changes an equivalent resistance of the OBC controller upon operation of a closed circuit formed between the external charger and the OBC controller, and
the OBC controller does not output power to an output side even when the external charger supplies power as the first switch is closed.

20. The vehicle according to claim 19, wherein the external charger supplies charging power to the OBC controller when a voltage change due to change in the equivalent resistance is detected.

21. A non-transitory recording medium having instructions which cause a controller to execute the steps of the method of claim 1.

* * * * *